United States Patent
Lee et al.

(10) Patent No.: US 12,284,524 B2
(45) Date of Patent: Apr. 22, 2025

(54) SECURE eSIM SUBSCRIPTION TRANSFER

(71) Applicant: Apple Inc., Cupertino, CA (US)

(72) Inventors: Hyewon Lee, Cupertino, CA (US); Xiangying Yang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 171 days.

(21) Appl. No.: 18/317,323

(22) Filed: May 15, 2023

(65) Prior Publication Data

US 2023/0403563 A1 Dec. 14, 2023

Related U.S. Application Data

(60) Provisional application No. 63/366,102, filed on Jun. 9, 2022.

(51) Int. Cl.
*H04W 12/72* (2021.01)
*H04L 9/32* (2006.01)
*H04W 12/106* (2021.01)

(52) U.S. Cl.
CPC .......... *H04W 12/72* (2021.01); *H04L 9/3228* (2013.01); *H04W 12/106* (2021.01)

(58) Field of Classification Search
CPC .... H04W 12/72; H04W 12/106; H04L 9/3228
USPC .......................................................... 713/155
See application file for complete search history.

(56) References Cited

U.S. PATENT DOCUMENTS

| | | | | |
|---|---|---|---|---|
| 10,484,752 B2* | 11/2019 | Beals | ........... | H04L 9/3247 |
| 10,484,753 B2* | 11/2019 | Beals | ........... | H04L 9/3236 |
| 11,129,026 B1* | 9/2021 | Chauhan | ........... | H04W 4/50 |
| 11,172,350 B1* | 11/2021 | Chaugule | ........... | H04W 4/24 |
| 2013/0227646 A1* | 8/2013 | Haggerty | ........... | H04L 63/10 726/3 |
| 2017/0288872 A1* | 10/2017 | Lu | ........... | H04L 9/32 |
| 2018/0060199 A1* | 3/2018 | Li | ........... | G06F 11/2094 |
| 2021/0076195 A1* | 3/2021 | Chaugule | ........... | H04W 12/40 |
| 2021/0400466 A1* | 12/2021 | Chaugule | ........... | H04W 60/04 |
| 2022/0095095 A1* | 3/2022 | Lim | ........... | H04W 12/069 |
| 2022/0174478 A1* | 6/2022 | Naujok | ........... | H04W 12/35 |
| 2022/0174495 A1* | 6/2022 | Lee | ........... | H04W 12/37 |
| 2022/0369096 A1* | 11/2022 | Yoon | ........... | H04W 8/183 |
| 2023/0232227 A1* | 7/2023 | Yu | ........... | H04L 9/0891 713/156 |

(Continued)

*Primary Examiner* — Thanh T Le

(74) *Attorney, Agent, or Firm* — DICKINSON WRIGHT RLLP

(57) ABSTRACT

The described embodiments set forth techniques for securely transferring a cellular wireless service subscription associated with an electronic subscriber identity module (eSIM) profile from a source wireless device to a target wireless device via communication with servers of a mobile network operator (MNO). An MNO provisioning server encrypts an activation code, used for transfer of the cellular wireless service subscription, with a session key generated based on a one-time-use eUICC public key and a one-time-use server private key. The encrypted activation code is protected from malicious third parties, as only the eUICC of the source wireless device can perform the decryption required by generating an identical session key to recover the activation code. The eUICC of the source wireless device deletes the eSIM profile from the eUICC before providing the activation code to the target wireless device to protect against eSIM profile cloning.

20 Claims, 9 Drawing Sheets

(56) References Cited

U.S. PATENT DOCUMENTS

| | | | |
|---|---|---|---|
| 2023/0262450 A1* | 8/2023 | Kang | H04W 8/183 |
| | | | 455/419 |
| 2023/0262641 A1* | 8/2023 | Agarwal | H04W 4/50 |
| | | | 455/406 |
| 2023/0328517 A1* | 10/2023 | Jung | H04W 12/06 |
| | | | 726/4 |

* cited by examiner

SECURE eSIM SUBSCRIPTION TRANSFER

CROSS-REFERENCE TO RELATED APPLICATIONS

The present application claims the benefit of U.S. Provisional Application No. 63/366,102, entitled "SECURE eSIM SUBSCRIPTION TRANSFER," filed Jun. 9, 2022, the content of which is incorporated by reference herein in its entirety for all purposes.

FIELD

The described embodiments set forth techniques for securely transferring an electronic subscriber identity module (eSIM) cellular wireless service subscription for an eSIM profile from a source wireless device to a target wireless device via communication with servers of a mobile network operator (MNO).

BACKGROUND

Many wireless devices are configured to use removable Universal Integrated Circuit Cards (UICCs) that enable the wireless devices to access services provided by Mobile Network Operators (MNOs). In particular, each UICC includes at least a microprocessor and a read-only memory (ROM), where the ROM is configured to store an MNO profile that the wireless device can use to register and interact with an MNO to obtain wireless services via a cellular wireless network. A profile may also be referred to as a subscriber identity module (SIM). Typically, a UICC takes the form of a small removable card, commonly referred to as a SIM card or a physical SIM (pSIM) card, which is inserted into a UICC-receiving bay of a wireless device. In more recent implementations, UICCs are being embedded directly into system boards of wireless devices as embedded UICCs (eUICCs), which can provide advantages over traditional, removable UICCs. The eUICCs can include a rewritable memory that can facilitate installation, modification, and/or deletion of one or more electronic SIMs (eSIMs) on the eUICC, where the eSIMs can provide for new and/or different services and/or updates for accessing extended features provided by MNOs. An eUICC can store a number of MNO profiles—also referred to herein as eSIMs—and can eliminate the need to include UICC-receiving bays in wireless devices.

Transfer of a UICC between wireless devices allows a user to re-use a SIM profile associated with a cellular wireless service subscription on different wireless devices. An eSIM, however, is stored on a non-removable eUICC. Methods to transfer a cellular wireless service subscription associated with an eSIM between wireless devices are under active development in wireless standards organizations. Security of the transfer of eSIMs is important to protect against malicious parties or malware misusing transfer information to redirect or clone eSIM profiles. There exists a need for methods to transfer securely an eSIM cellular wireless service subscription from a source wireless device to a target wireless device.

SUMMARY

This application sets forth techniques for securely transferring an electronic subscriber identity module (eSIM) cellular wireless service subscription from a source wireless device to a target wireless device. The source wireless device triggers the transfer by sending a unique identifier, e.g., an integrated circuit card identifier (ICCID) value, of an eSIM profile on an embedded integrated circuit card (eUICC) of the source wireless device, to a mobile network operator (MNO) provisioning server, e.g., a subscription manager data preparation (SM-DP+) server. The unique identifier of the eSIM profile is signed by the eUICC of the source wireless device for authentication by the MNO provisioning server. Responsive to receipt of a confirmation message from the MNO provisioning server indicating approval for transfer of the cellular wireless service subscription, the eUICC provides a one-time-use eUICC public key (otPK$_{eUICC}$) to the MNO provisioning server. To protect communication of an activation code for transfer of the cellular wireless service subscription, the MNO provisioning server generates a session key based on the one-time-use eUICC public key otPK$_{eUICC}$ and on a one-time-use server private key (otSK$_{Server}$). The MNO provisioning server subsequently encrypts the activation code using the session key and provides the encrypted version of the activation code along with a one-time-use server public key (otPK$_{Server}$) and an optional deletion flag in a server-signed data message to the source wireless device. The activation code can be used for transfer of the eSIM cellular wireless service subscription from the source wireless device to the target wireless device. The encrypted version of the activation code can only be decrypted by the eUICC of the source wireless device and cannot be decrypted by a local profile assistant (LPA) operable on a processor of the source wireless device external to the eUICC, thereby protecting the activation code from misappropriation by a malicious third party that intercepts communication of the source wireless device or by malware resident on the processor of the source wireless device. The eUICC of the source wireless device verifies a signature of the server-signed data message, received from the MNO provisioning server via the LPA, and generates an identical session key (to the session key generated at the MNO provisioning server) using a one-time-use eUICC private key (otSK$_{eUICC}$), which corresponds to the one-time-use eUICC public key otPK$_{eUICC}$ provided by the eUICC via the LPA to the MNO provisioning server, and the one-time-use server public key otPK$_{Server}$ received from the MNO provisioning server in the signed data message. The eUICC of the source wireless device uses the session key to decrypt the encrypted version of the activation code to obtain an unencrypted version of the activation code. The session key is maintained by the eUICC and not provided to the LPA of the source wireless device. The eUICC of the source wireless device can also ensure deletion of the eSIM profile before the unencrypted version of the activation code is available for transfer to the target wireless device. After deleting the eSIM profile, the eUICC provides the unencrypted version of the activation code, optionally with a delete notification message, to the LPA of the source wireless device to provide to the target wireless device. Transfer of the activation code between the source wireless device and the target wireless device can use a local connection, such as a short distance Bluetooth connection, or via a quick response (QR) code displayed on the source wireless device and scanned by the target wireless device. The target wireless device can use the unencrypted version of the activation code to obtain a new eSIM corresponding to the transferred cellular wireless service subscription from an MNO provisioning server. If a delete notification message accompanies the activation code, the target wireless device can send the optionally provided delete notification message to the MNO provisioning server with a request to download the new eSIM or in a separate message to the same (or to another) MNO provisioning server to confirm deletion of the eSIM profile from the eUICC of the source wireless device. The procedure described herein improves security of the transfer of the cellular wireless service subscription associated with the eSIM profile by ensuring only the eUICC of the source wireless device (and no intervening entities) can decrypt an encrypted version of the activation code, and the eUICC of the source wireless device enforces deletion of the eSIM profile from the eUICC of the source wireless device before providing the unencrypted version of the activation code to the LPA of the source wireless device for transfer to the target wireless device.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
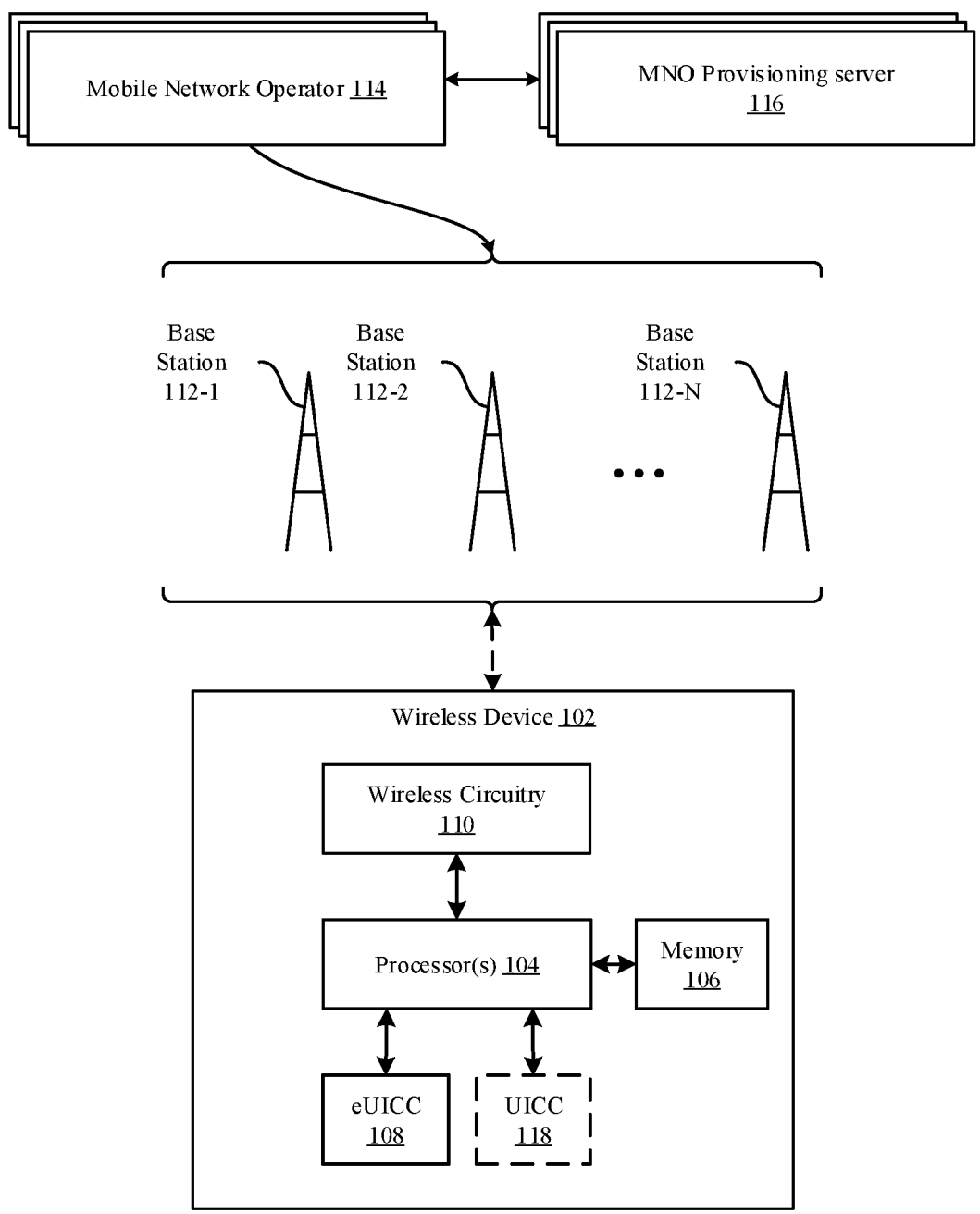
FIG. 1 illustrates a block diagram of different components of an exemplary system configured to implement the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

This application sets forth techniques for securely transferring an electronic subscriber identity module (eSIM) cellular wireless service subscription from a source wireless device to a target wireless device. Global wireless standards organizations are actively developing mechanisms to transfer a user's cellular wireless service subscription associated with an electronic subscriber identity module (eSIM) from a first wireless device, e.g., a source wireless device, to a second wireless device, e.g., a target wireless device. An eSIM profile installed on an embedded universal integrated circuit card (eUICC) of the source wireless device is deleted from the eUICC, and a new eSIM profile is installed on a corresponding eUICC of the target wireless device, where both eSIM profiles are associated with the same cellular wireless service subscription. The source wireless device triggers the transfer by sending a unique identifier, e.g., an integrated circuit card identifier (ICCID) value, of an eSIM profile on the eUICC of the source wireless device, to a mobile network operator (MNO) provisioning server, e.g., a subscription manager data preparation (SM-DP+) server. The unique identifier of the eSIM profile is signed by the eUICC of the source wireless device for authentication by the MNO provisioning server. The MNO provisioning server confirms, with one or more MNO infrastructure servers, the requested transfer of the cellular wireless service subscription associated with the eSIM profile of the source wireless device to a target wireless device. Upon authorization of the request to transfer the eSIM subscription to a target wireless device, the MNO provisioning server returns to the source wireless device a confirmation message, which can optionally include i) an indication that user authentication via a confirmation code is required for transfer of the cellular wireless service subscription and/or ii) a deletion flag to indicate that the eSIM profile on the source wireless device must be deleted from the eUICC of the source wireless device before an eSIM profile can be provided to the target wireless device. The MNO infrastructure server can provide the optional confirmation code via an out-of-band channel, e.g., via a short message system (SMS)

message or other two-factor authentication procedure, to the source wireless device to obtain user confirmation for transfer of the cellular wireless service subscription.

Responsive to receipt of the confirmation message from the MNO provisioning server indicating approval to transfer the cellular subscription, the eUICC provides to the MNO provisioning server an eUICC-signed message that includes a one-time-use eUICC public key (otPK$_{eUICC}$). Additionally, when the confirmation message from the MNO provisioning server includes a confirmation code indication requirement, the eUICC-signed message includes a confirmation code hash value, which the MNO provisioning server can use to confirm user authentication via the confirmation code previously sent. The MNO provisioning server uses i) the one-time-use eUICC public key otPK$_{eUICC}$ and ii) a one-time-use server private key (otSK$_{Server}$) to generate a session key. The MNO provisioning server subsequently encrypts, using the session key, an activation code linked to an eSIM profile for the target wireless device and provides the encrypted version of the activation code along with a one-time-use server public key (otPK$_{Server}$), which corresponds to the one-time-use server private key otSK$_{Server}$, in a server-signed data message to the source wireless device. In some embodiments, the server-signed data message includes a deletion flag indicating that deletion of the eSIM profile, from the eUICC of the source wireless device, is required before the activation code can be used for transfer of the cellular wireless service subscription to the eSIM profile for the target wireless device.

The activation code can be used to transfer the cellular wireless service subscription associated with the eSIM profile of the source wireless device to a corresponding eSIM profile designated for the target wireless device. The encrypted version of the activation code can only be decrypted by the eUICC of the source wireless device and cannot be decrypted by a local profile assistant (LPA) operable on a processor of the source wireless device external to the eUICC, as only the eUICC possesses a one-time-use eUICC private key (otSK$_{eUICC}$). Encryption of the activation code by the MNO provisioning server protects the activation code from misappropriation by a malicious third party that intercepts communication of the source wireless device to acquire the activation code or by malware resident on the processor of the source wireless device that seeks to misuse the activation code. The eUICC of the source wireless device verifies a signature of the signed data message received from the MNO provisioning server and generates an identical session key using i) the one-time-use eUICC private key otSK$_{eUICC}$, which corresponds to the one-time-use eUICC public key otPK$_{eUICC}$ previously provided to the MNO provisioning server, and ii) the one-time-use server public key otPK$_{Server}$ provided by the MNO provisioning server in the signed data message. The eUICC of the source wireless device uses the session key to decrypt the encrypted version of the activation code to obtain an unencrypted version of the activation code. The eUICC of the source wireless device deletes the eSIM profile associated with the transferring the cellular wireless service subscription associated with the eSIM profile before providing the unencrypted version of the activation code to the LPA of the source wireless device. After deleting the eSIM profile, the eUICC provides the unencrypted version of the activation code to the LPA of the source wireless device to provide to the target wireless device. In some embodiments, the eUICC can provide a delete notification message with the unencrypted version of the activation code to the LPA of the source wireless device. The LPA of the source wireless device provides the unencrypted version of the activation code to the target wireless device to use to obtain a new eSIM profile from an MNO provisioning server, where the new eSIM profile is associated with the transferred cellular wireless service subscription. In some embodiments, the activation code is pre-associated by the MNO provisioning server with the new eSIM profile before providing the activation code to the source wireless device. In some embodiments, the LPA of the source wireless device provides the delete notification message from the eUICC of the source wireless device to the target wireless device with the activation code. The target wireless device can include the delete notification message with a request sent to an MNO provisioning server to download the new eSIM profile for the transferred cellular wireless service subscription. In some embodiments, the target wireless device sends a separate message to an MNO provisioning server to confirm deletion of the eSIM profile associated with the transferred cellular wireless service subscription from the eUICC of the source wireless device. In some embodiments, the source wireless device sends the delete notification message to the MNO provisioning server via a non-cellular wireless connection or via a cellular wireless connection using a different SIM profile available in the source wireless device. The procedure described herein improves security of the transfer of the cellular wireless service subscription associated with an eSIM profile from a source wireless device to a target wireless device by ensuring only the eUICC of the source wireless device (and no intervening entities) can decrypt an encrypted version of the activation code and the eUICC of the source wireless device enforces deletion of the eSIM profile from the eUICC of the source wireless device before providing the unencrypted version of the activation code to the LPA of the source wireless device for transfer to the target wireless device.

These and other embodiments are discussed below with reference to FIGS. 1 through 5; however, those skilled in the art will readily appreciate that the detailed description given herein with respect to these figures is for explanatory purposes only and should not be construed as limiting.

FIG. 1 illustrates a block diagram of different components of a system 100 that is configured to implement the various techniques described herein, according to some embodiments. More specifically, FIG. 1 illustrates a high-level overview of the system 100, which, as shown, includes a wireless device 102, which can also be referred to as a device, a mobile wireless device, a mobile device, a user equipment (UE) and the like, a group of base stations 112-1 to 112-N that are managed by different Mobile Network Operators (MNOs) 114, and a set of MNO provisioning servers 116 that are in communication with the MNOs 114. In some embodiments, one or more of the MNO provisioning servers 116 are subscription manager data preparation (SM-DP+) servers. Additional MNO infrastructure servers, such as used for account management and billing are not shown. The wireless device 102 can represent a mobile computing device (e.g., an iPhone® or an iPad® by Apple®), the base stations 112-1 to 112-n can represent cellular wireless network entities including evolved NodeBs (eNodeBs or eNBs) and/or next generation NodeBs (gNodeBs or gNB) that are configured to communicate with the wireless device 102, and the MNOs 114 can represent different wireless service providers that provide specific cellular wireless services (e.g., voice and data) to which the wireless device 102 can subscribe, such as via a subscription account for a user of the wireless device 102.

As shown in FIG. 1, the wireless device 102 can include processing circuitry, which can include one or more processor(s) 104 and a memory 106, an embedded Universal Integrated Circuit Card (eUICC) 108, and a baseband wireless circuitry 110 used for transmission and reception of cellular wireless radio frequency signals. The baseband wireless circuitry 110 can include analog hardware components, such as antennas and amplifiers, as well as digital processing components, such as signal processors (and/or general/limited purpose processors) and associated memory. In some embodiments, the wireless device 102 includes one or more physical UICCs 118, also referred to as Subscriber Identity Module (SIM) cards, in addition to or substituting for the eUICC 108. The components of the wireless device 102 work together to enable the wireless device 102 to provide useful features to a user of the wireless device 102, such as cellular wireless network access, non-cellular wireless network access, localized computing, location-based services, and Internet connectivity. The eUICC 108 can be configured to store multiple electronic SIMs (eSIMs) for accessing cellular wireless services provided by different MNOs 114 by connecting to their respective cellular wireless networks through base stations 112-1 to 112-N. For example, the eUICC 108 can be configured to store and manage one or more eSIMs for one or more MNOs 114 for different subscriptions to which the wireless device 102 is associated. To be able to access services provided by an MNO, an eSIM is reserved for subsequent download and installation to the eUICC 108. In some embodiments, the eUICC 108 obtains one or more eSIMs from one or more associated MNO provisioning servers 116. The MNO provisioning servers 116 can be maintained by a manufacturer of the wireless device 102, the MNOs 114, third party entities, and the like. Communication of eSIM data between an MNO provisioning server 116 and the eUICC 108 (or between the MNO provisioning server 116 and processing circuitry of the wireless device 102 external to the eUICC 108, e.g., the processor 104) can use a secure communication channel.

Figure 2:
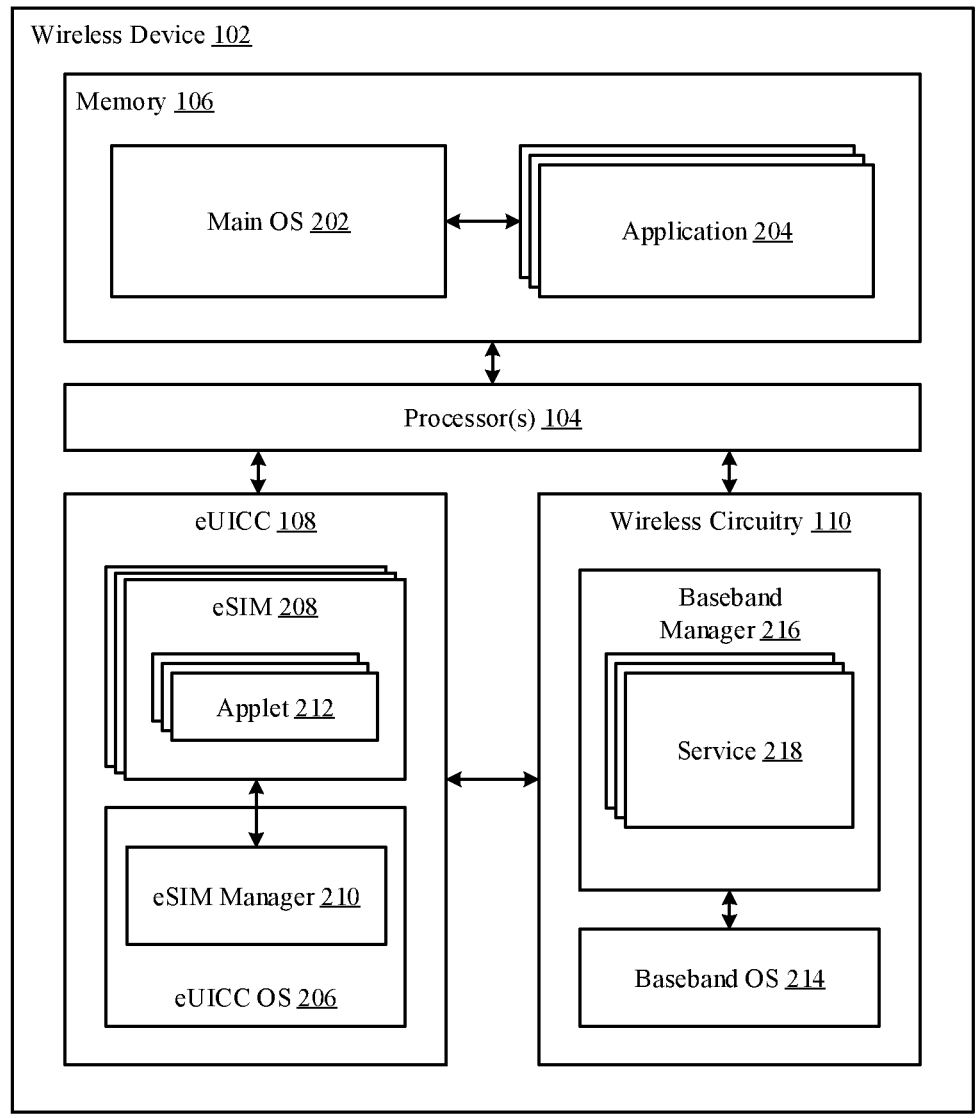
FIG. 2 illustrates a block diagram of a more detailed view of exemplary components of the system of FIG. 1, according to some embodiments.

FIG. 2 illustrates a block diagram of a more detailed view 200 of particular components of the wireless device 102 of FIG. 1, according to some embodiments. As shown in FIG. 2, the processor(s) 104, in conjunction with memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage hardware resources of the eUICC 108 (e.g., a processor and a memory embedded in the eUICC 108). The eUICC OS 206 can also be configured to manage eSIMs 208 that are stored by the eUICC 108, e.g., by downloading, installing, deleting, enabling, disabling, modifying, or otherwise performing management of the eSIMs 208 within the eUICC 108 and providing baseband wireless circuitry 110 with access to the eSIMs 208 to provide access to wireless services for the wireless device 102. The eUICC 108 OS can include an eSIM manager 210, which can perform management functions for various eSIMs 208. According to the illustration shown in FIG. 2, each eSIM 208 can include a number of applets 212 that define the manner in which the eSIM 208 operates. For example, one or more of the applets 212, when implemented in conjunction with baseband wireless circuitry 110 and the eUICC 108, can be configured to enable the wireless device 102 to communicate with an MNO 114 and provide useful features (e.g., phone calls and internet access) to a user of the wireless device 102.

As also shown in FIG. 2, the baseband wireless circuitry 110 of the wireless device 102 can include a baseband OS 214 that is configured to manage hardware resources of the baseband wireless circuitry 110 (e.g., a processor, a memory, different radio components, etc.). According to some embodiments, the baseband wireless circuitry 110 can implement a baseband manager 216 that is configured to interface with the eUICC 108 to establish a secure channel with an MNO provisioning server 116 and obtaining information (such as eSIM data) from the MNO provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the wireless device 102 and MNOs 114 according to the different eSIMs 208 that are enabled within the eUICC 108.

Figure 3:
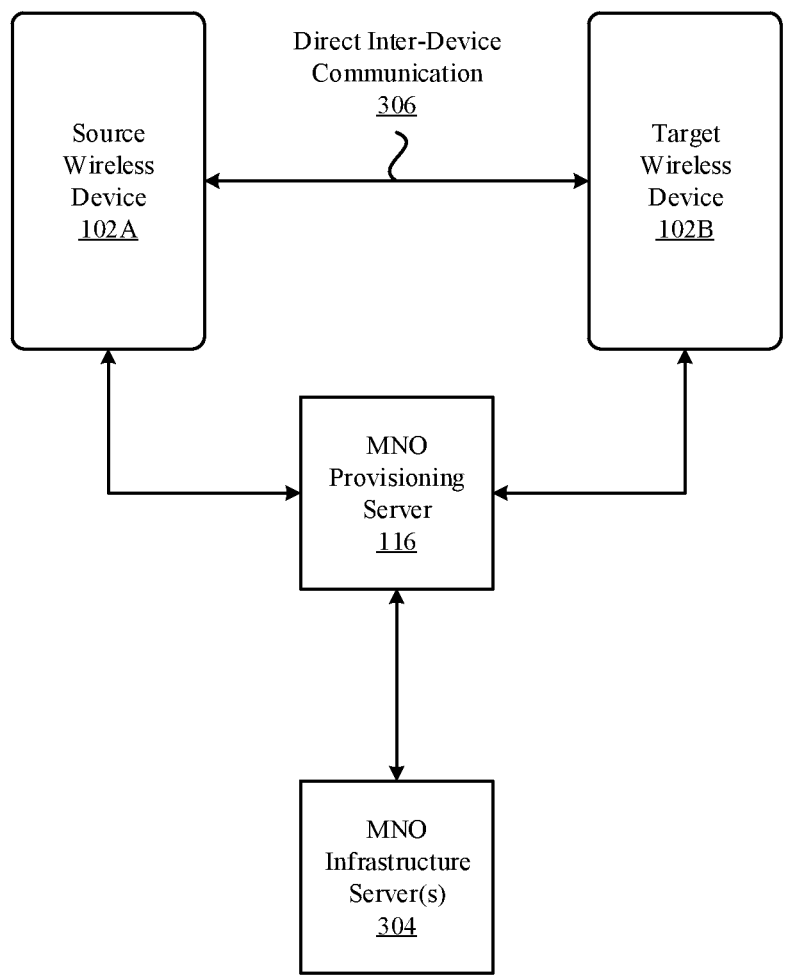
FIG. 3 illustrates a block diagram of exemplary communication paths and network entities for transfer of a cellular wireless service subscription associated with an eSIM of a source wireless device to a target wireless device, according to some embodiments.

FIG. 3 illustrates a diagram 300 of an exemplary interconnected set of components of a communication system that can be used to transfer an eSIM 208 from a source wireless device 102A to a target wireless device 102B. The source and target wireless devices 102A, 102B can use a direct inter-device communication path 306, e.g., using one or more various wireless technologies, such as near field communication (NFC), Bluetooth, peer-to-peer wireless local area network, and/or Wi-Fi. In some embodiments, the source and target wireless devices 102A, 102B communicate indirectly via an intervening network and/or cloud-based service (not shown). In some embodiments, the source and target wireless devices 102A, 102B do not establish a communication path, and communication is via an out-of-band channel (not shown), such as via one or more users of the source and target wireless devices 102A, 102B. For example, information displayed on one of the source and target wireless devices 102A, 102B can be transferred to the other of the source and target wireless devices 102A, 102B by a user (or users) using an input/output mechanism, such as a touch display or a camera. In some embodiments, each of the source and target wireless devices 102A, 102B are associated with a common user account maintained by a device manufacturer cloud network service (not shown). In some embodiments, the source and target wireless devices 102A, 102B are associated with a common user cellular wireless service subscription account. The source wireless device 102A can communicate with an MNO provisioning server 116 to obtain an activation code to provide to the target wireless device 102B to allow transfer of a cellular wireless service subscription associated with an eSIM 208 on the eUICC 108 of the source wireless device 102A to the target wireless device 102B. The source wireless device 102A can communicate the activation code via the direct inter-device communication path 306, or via an indirect communication path (not shown). The target wireless device 102B use the activation code to indicate authority to download and install an eSIM profile 208 from the MNO provisioning server 116, where the eSIM profile 208 is associated with the cellular wireless service subscription transferred from the source wireless device 102A. The MNO provisioning server 116 can determine whether to approve transfer of the eSIM subscription from the source wireless device 102A to the target wireless device 102B by communicating with one or more MNO infrastructure servers 304, which can also update user cellular wireless subscription information as required to complete the transfer. Representative MNO infrastructure servers 304 include back-end servers that manage subscriber accounts and billing services.

Figure 4A:
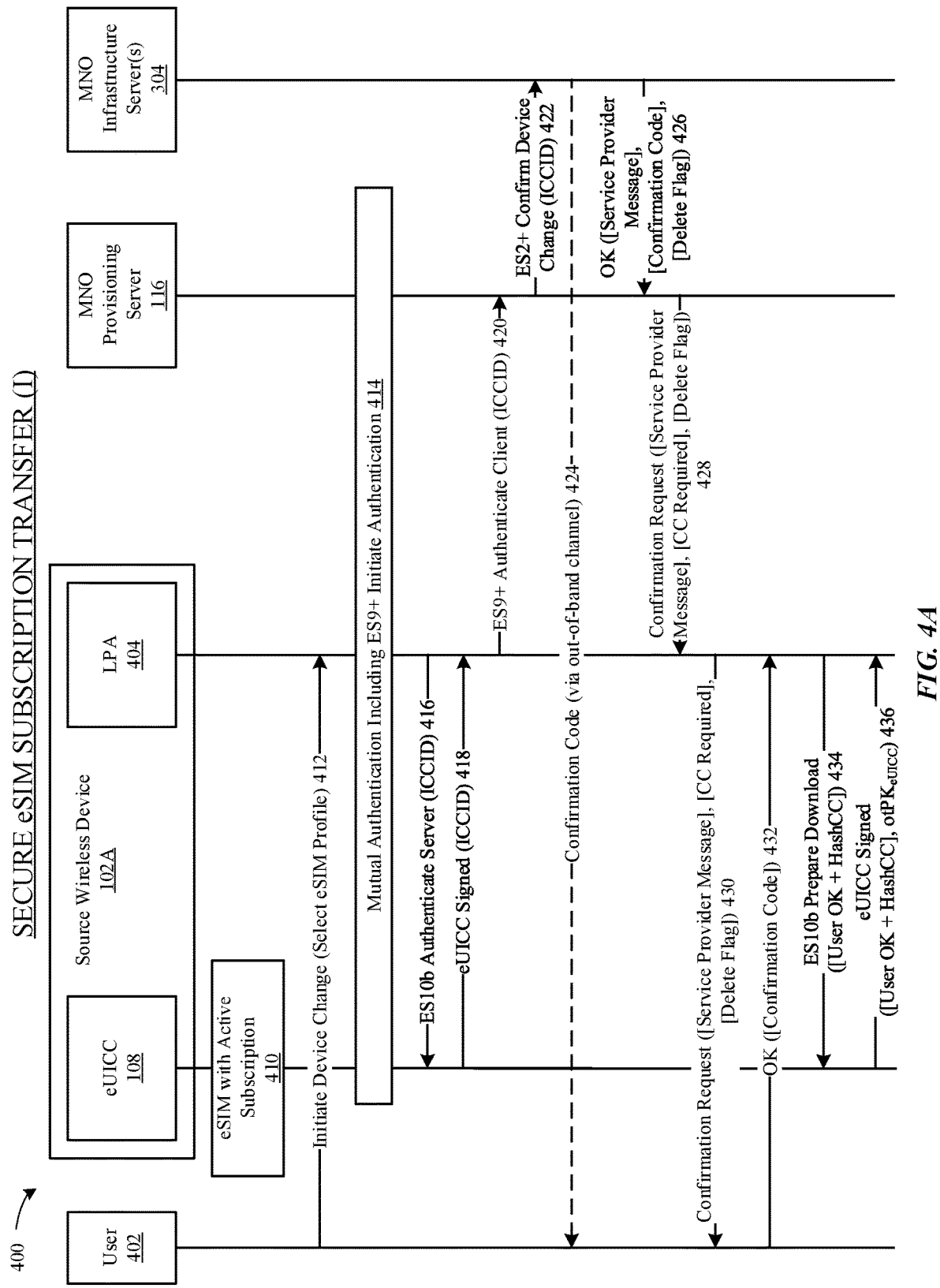
FIGS. 4A and 4B illustrate an exemplary communication call flow for transfer of a cellular wireless service subscription associated with an eSIM of a source wireless device, according to some embodiments.
Figure 4B:
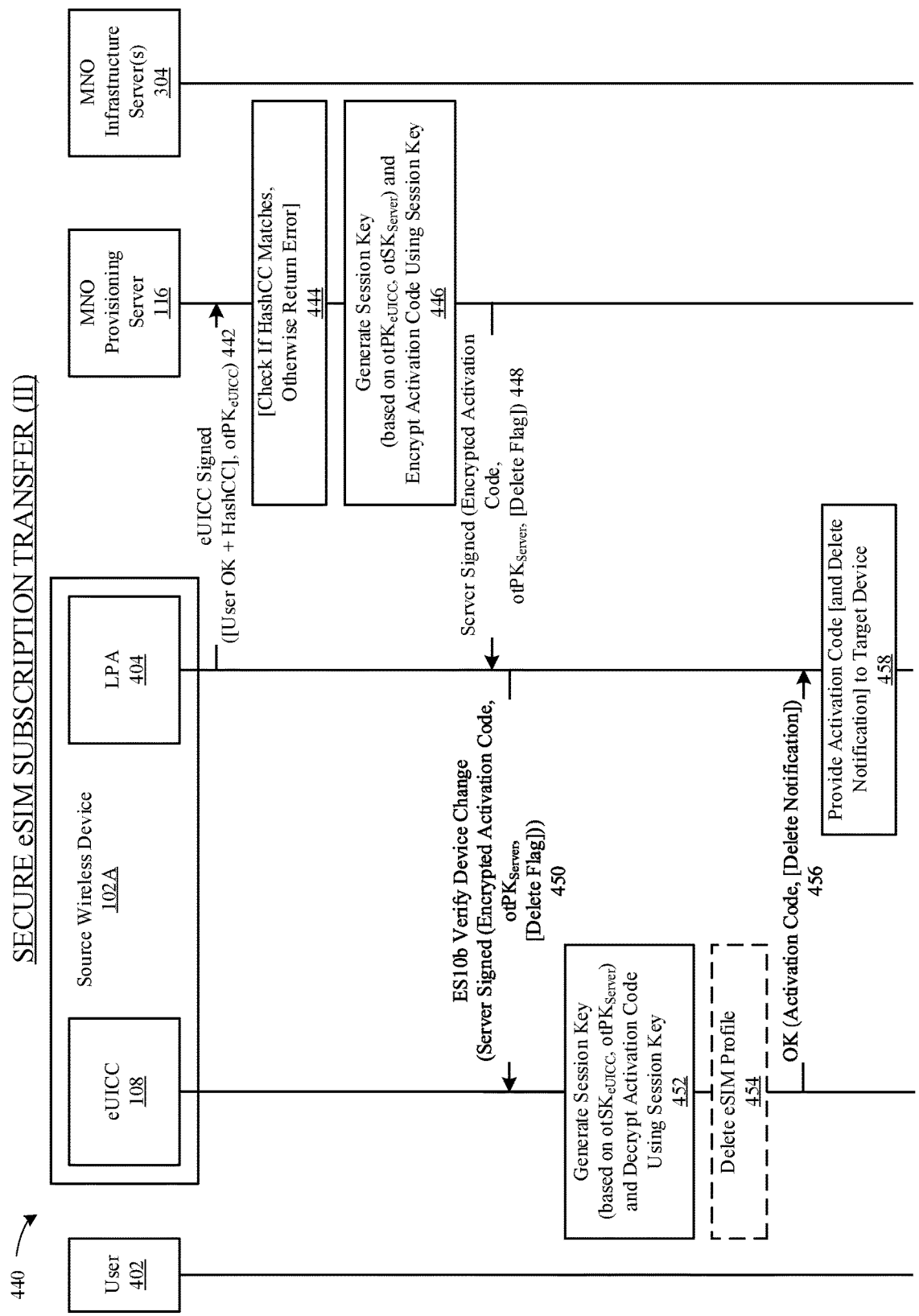

FIGS. 4A and 4B illustrate diagrams 400, 440 of an exemplary flow of messages and actions to transfer a cellular wireless service subscription associated with an eSIM 208 on a source wireless device 102A to a new eSIM 208 to be installed on a target wireless device 102B. Optional actions, messages, or information included in messages are displayed by dashed lines, dashed boxes, or contained within square brackets as shown. At 410, an eSIM profile 208 with an active cellular wireless service subscription is present on the eUICC 108 of the source wireless device 102A. At 412, a user 402 initiates a device change for the eSIM profile 208, by selecting the eSIM profile 208 via an input/output display (not shown) of the source wireless device 102A, where a cellular wireless service subscription associated with the selected eSIM profile 208 is to be transferred from the source wireless device 102A to the target wireless device 102B. A local profile assistant (LPA) 404, executing on a processor of the source wireless device 102A external to an eUICC 108 of the source wireless device 102A on which the selected eSIM 208 is presently installed, receives the user indication to initiate the transfer. At 414, the eUICC 108 of the source wireless device 102A initiates a mutual authentication procedure, via the LPA 404 of the source wireless device 102A, with an MNO provisioning server 116 associated with the cellular wireless service subscription of the selected eSIM profile 208. At 416, the LPA 404 sends to the eUICC 108 a server authentication message, e.g., an ES10b Authenticate Server message, which includes a unique identifier, e.g., an integrated circuit card identifier (ICCID) value, for the selected eSIM profile 208. At 418, the eUICC 108 returns to the LPA 404 an eUICC-signed message that includes the ICCID value of the selected eSIM profile 208. At 420, the LPA 404 sends to the MNO provisioning server 116 a client authentication message, e.g., an ES9+ Authenticate Client message, which includes the ICCID value. At 422, the MNO provisioning server 116 sends to one or more MNO infrastructure servers 304 a device change message, e.g., an ES2+ Confirm Device Change message, confirming transfer of a cellular wireless service subscription associated with the eSIM profile 208 identified by the ICCID value, from the source wireless device 102A to another wireless device (not yet identified). At 424, in some embodiments, the MNO infrastructure server 304 sends a confirmation code message to a user of the source wireless device 102A via an out-of-band communication channel, e.g., such as by sending a short message system (SMS) message to a phone number associated with the cellular wireless service subscription. At 426, the MNO infrastructure server 304 sends an OK reply message to the MNO provisioning server 116 responsive to the device change message received at 422. The OK reply message can include optionally one or more of: i) a service provider message, ii) a copy of the confirmation code, and/or iii) a deletion flag (denoted as "delete flag") that indicates whether the eSIM profile 208 must be deleted from the eUICC 108 of the source wireless device 102A as part of the transfer of the cellular wireless service subscription associated with the eSIM profile 208 to another wireless device. At 428, the MNO provisioning server 116 sends a confirmation request message to the LPA 404 of the source wireless device 102A. The confirmation request message can include one or more of i) the service provider message, ii) the indication that a confirmation code is required, and/or iii) the delete flag that indicates whether the eSIM profile 208 must be deleted from the eUICC 108 of the source wireless device 102A, based on what information was included in the OK reply message received previously at 426 from the MNO infrastructure server 304. At 430, the LPA 404 of the source wireless device 102A provides one or more notifications to a user 402 of the source wireless device 102A based on the confirmation request message received from the MNO provisioning server 116. The one or more notifications can indicate confirmation of the request to transfer the cellular wireless service subscription associated with the selected eSIM profile 208, an optional service provider message, an indication that a separate confirmation code response is required, and/or an indication that deletion of the selected eSIM profile 208 from the eUICC 108 of the source wireless device 102A is required by the MNO 114 in association with the transfer of the cellular wireless service subscription. At 432, the user 402 responds with an OK message to the LPA 404 of the source wireless device 102A, where the OK message can include the confirmation code received via the out-of-band channel at 424 previously. At 434, the LPA 404 sends a message, e.g., an ES10b Prepare Download message, to the eUICC 108, the message optionally including an indication of an OK confirmation from the user and a hashed version of the confirmation code. At 436, the eUICC 108 returns to the LPA 404 an eUICC-signed message that includes a one-time-use eUICC public key (otPK$_{eUICC}$) and optionally a copy of the user OK confirmation with the hashed version of the confirmation code. At 442, the LPA 404 of the source wireless device 102A forwards the eUICC-signed message to the MNO provisioning server 116. At 444, the MNO provisioning server 116 checks whether the hashed version of the confirmation code (if included in the eUICC-signed message) matches the confirmation code received 426 from the MNO infrastructure server. When the confirmation code was used and the hashed version of the confirmation code matches, the MNO provisioning server 116 continues with the transfer procedure. When the confirmation code was used and the hashed version of the confirmation code does not match, the MNO provisioning server 116 can return an error message to the LPA 404 of the source wireless device 102A. When proceeding with the transfer, the MNO provisioning server 116 uses the one-time-use eUICC public key otPK$_{eUICC}$ with a one-time-use server private key (otSK$_{Server}$) to generate a session key and encrypts an activation code for transfer of the cellular wireless service subscription using the session key. The activation code can be associated with an eSIM profile 208 yet to be downloaded and installed on an eUICC 108 of another wireless device 102, e.g., on an eUICC 108 of the target wireless device 102B. At 448, the MNO provisioning server 116 sends a server-signed message to the LPA 404 of the source wireless device 102A, the server-signed message including the encrypted version of the activation code with a one-time-use server public key (otPK$_{Server}$), which corresponds to the one-time-use server private key otSK$_{Server}$ used to generate the session key. The server-signed message can optionally include a deletion flag to indicate to the eUICC 108 of the source wireless device 102A that the eSIM profile 208 associated with the cellular wireless service subscription being transferred must be deleted from the eUICC 108 as part of the transfer procedure. At 450, the LPA 404 sends a message, e.g., an ES10b Verity Device Change message, to the eUICC 108, the message including the server-signed message received at 448 from the MNO provisioning server 116. Notably, the LPA 404 is not able to decrypt the encrypted version of the activation code (as the LPA 404 cannot generate the session key required for decryption), nor is the LPA 404 able to surreptitiously remove the deletion flag (if included) from the message, because the eUICC 108 can validate the server-signed message to ensure integrity of the content included therein. At 452, the eUICC 108 generates a session key, identical to the session key generated by the MNO provisioning server at 446, using the one-time-use server public key otPK$_{Server}$ included in the server-signed message and a one-time-use eUICC private key (otSK$_{eUICC}$) that corresponds to the one-time-use eUICC public key otPK$_{eUICC}$ sent to the MNO provisioning server at 442. The eUICC 108, further at 452, uses the session key to decrypt the encrypted version of the activation code and extract an unencrypted version of the activation code. At 454, the eUICC 108 optionally deletes the eSIM profile 208 associated with the transferred cellular wireless service subscription. Deletion of the eSIM profile 208 can be required based on a deletion flag included in the message received in the server-signed message. In some embodiments, the eUICC 108 deletes the eSIM profile 208 in association with transfer of the cellular wireless service subscription before providing the unencrypted version of the activation code to the LPA 404 of the source wireless device 102A, where deletion occurs independently of whether a deletion flag is included in the server-signed message. At 456, the eUICC 108 sends to the LPA 404 an OK reply message that includes the unencrypted version of the activation code and optionally a delete notification message intended for the MNO provisioning server 116. At 458, the LPA 404 provides the unencrypted version of the activation code to the target wireless device 102B.

Transfer of the unencrypted version of the activation code can be accomplished using a local wireless connection, such as via a secure Bluetooth, close proximity connection or via a peer-to-peer connection. In some embodiments, the unencrypted version of the activation code is embedded in a quick response (QR) code, which can be provided to the target wireless device 102B. In some embodiments, the QR code is displayed on the source wireless device 102A for transfer to the target wireless device 102B via a camera scan by the target wireless device 102B. The target wireless device 102B provides the unencrypted version of the activation code to the MNO provisioning server 116 to obtain an eSIM profile 208 reserved for the transferred cellular wireless service subscription. In some embodiments, the target wireless device 102B sends the activation code to the MNO provisioning server 116 in an ES9+ Authenticate Client message. In some embodiments, the target wireless device 102B includes the delete notification message with the activation code in the ES9+ Authenticate Client message. In some embodiments, the target wireless device 102B sends the delete notification message to the same (or to another) MNO provisioning server 116 in an ES9+ Handle Notification message separately from the activation code included in the ES9+ Authenticate Client message.

Figure 5A:
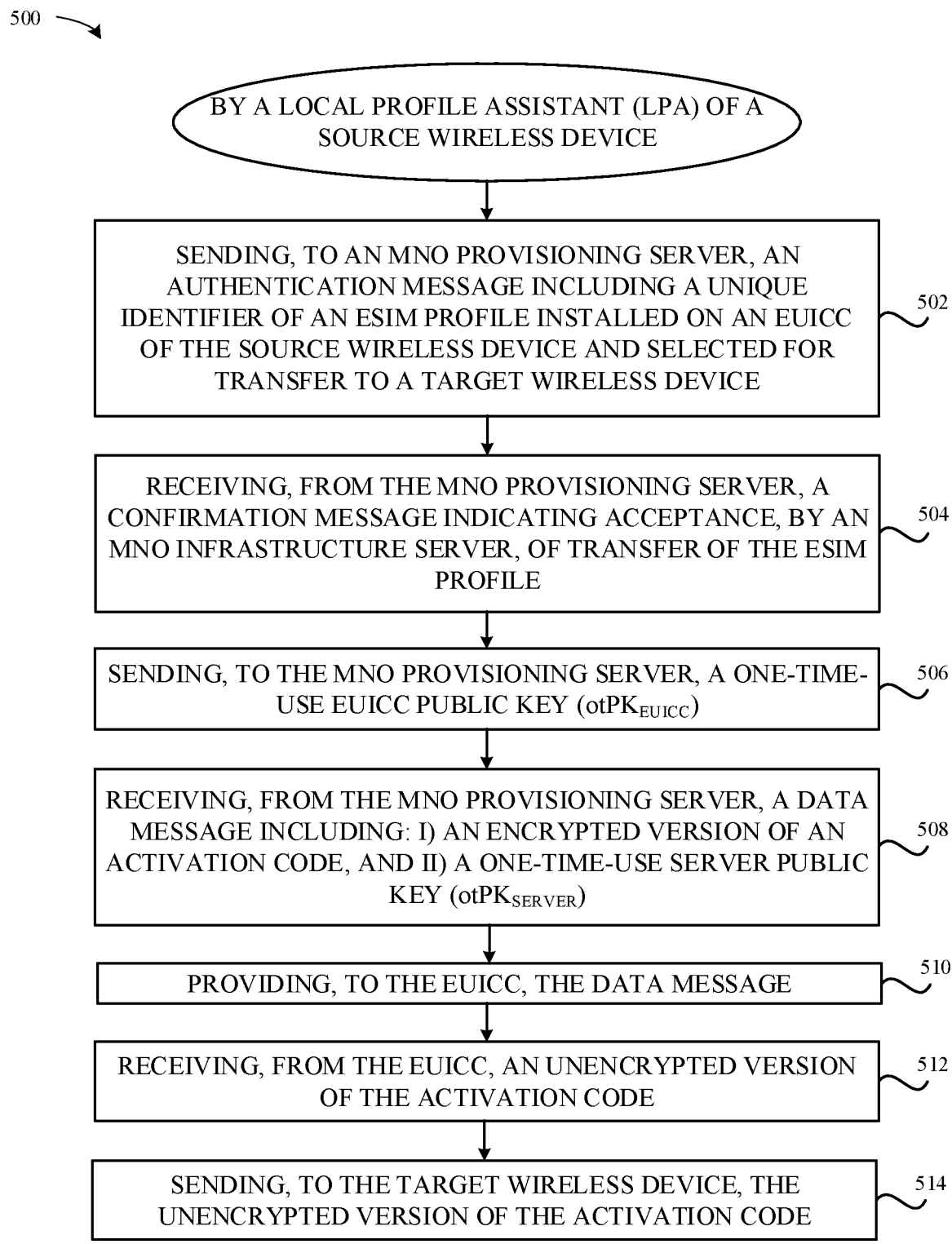
FIG. 5A illustrates a flowchart of an exemplary method performed by a local profile assistant (LPA) of a source wireless device to transfer a cellular wireless service subscription associated with an eSIM profile of the source wireless device to a target wireless device, according to some embodiments.

FIG. 5A illustrates a flowchart 500 of an exemplary method performed by an LPA 404 of a source wireless device 102A to transfer a cellular wireless service subscription associated with an eSIM profile 208 of the source wireless device 102A to a target wireless device 102B. At 502, the LPA 404 sends, to an MNO provisioning server 116, an authentication message including a unique identifier of an eSIM profile 208 installed on an eUICC 108 of the source wireless device 102A and selected for transfer to the target wireless device 102B. At 504, the LPA 404 receives, from the MNO provisioning server 116, a confirmation message indicating acceptance, by an MNO infrastructure server 304, of transfer of the eSIM profile 208. At 506, the LPA 404 sends, to the MNO provisioning server 116, a one-time-use eUICC public key (otPK$_{eUICC}$). At 508, the LPA 404 receives, from the MNO provisioning server 116, a data message including: i) an encrypted version of an activation code, and ii) a one-time-use server public key (otPK$_{Server}$). The activation code allows the target wireless device 102B to obtain, from the MNO provisioning server 116, a new eSIM profile 208 associated with transfer of the eSIM cellular wireless service subscription to the target wireless device 102B. The MNO provisioning server 116 generates the encrypted version of the activation code using a session key based on the (otPK$_{eUICC}$) and one a one-time-use server private key (otSK$_{Server}$) corresponding to the otPK$_{Server}$. At 510, the LPA 404 provides, to the eUICC 108, the data message. At 512, the LPA 404 receives, from the eUICC 108, an unencrypted version of the activation code. At 514, the LPA 404 sends, to the target wireless device 102B, the unencrypted version of the activation code.

In some embodiments, the data message, received from the MNO provisioning server 116, further includes i) a deletion flag requiring deletion of the eSIM profile 208 from the eUICC 108 of the source wireless device 102A, and ii) a signature generated by the MNO provisioning server 116; and the eUICC 108 verifies integrity of the data message using the signature to protect against alteration of the data message that includes the deletion flag. In some embodiments, the eUICC 108 deletes the eSIM profile 208, when the data message includes the deletion flag, before providing to the LPA 404 the unencrypted version of the activation code. In some embodiments, the method performed by the LPA 404 of the source wireless device 102A further includes: i) receiving, from the eUICC 108 with the unencrypted version of the activation code, a delete profile notification message indicating deletion of the eSIM profile 208 from the eUICC 108; and ii) providing, to the target wireless device 102B with the activation code, the delete profile notification message. In some embodiments, the target wireless device 102B sends the delete profile notification message to the MNO provisioning server 116 to confirm deletion of the eSIM profile 208 from the eUICC 108 of the source wireless device 102A. In some embodiments, the target wireless device 102B sends the delete profile notification message to the MNO provisioning server 116 together with a request to obtain the new eSIM profile 208. In some embodiments, the target wireless device 102B sends the delete profile notification message to the MNO provisioning server 116 separately from a request to obtain the new eSIM profile 208. In some embodiments, the confirmation message received from the MNO provisioning server 116 includes an indication that user authentication via a confirmation code is required for transfer of the eSIM profile 208, and the method further includes the LPA 404 of the source wireless device 102A receiving, via an input/output of the source wireless device 102A, user authentication for transfer of the eSIM profile 208. In some embodiments, the user authentication includes the confirmation code. In some embodiments, the method further includes the LPA 404 of the source wireless device 102A sending, to the MNO provisioning server 116, a hashed version of the confirmation code with the otPK$_{eUICC}$ to allow the MNO provisioning server 116 to confirm receipt of the confirmation code by the source wireless device 102A before sending the encrypted version of the activation code to the source wireless device 102A.

Figure 5B:
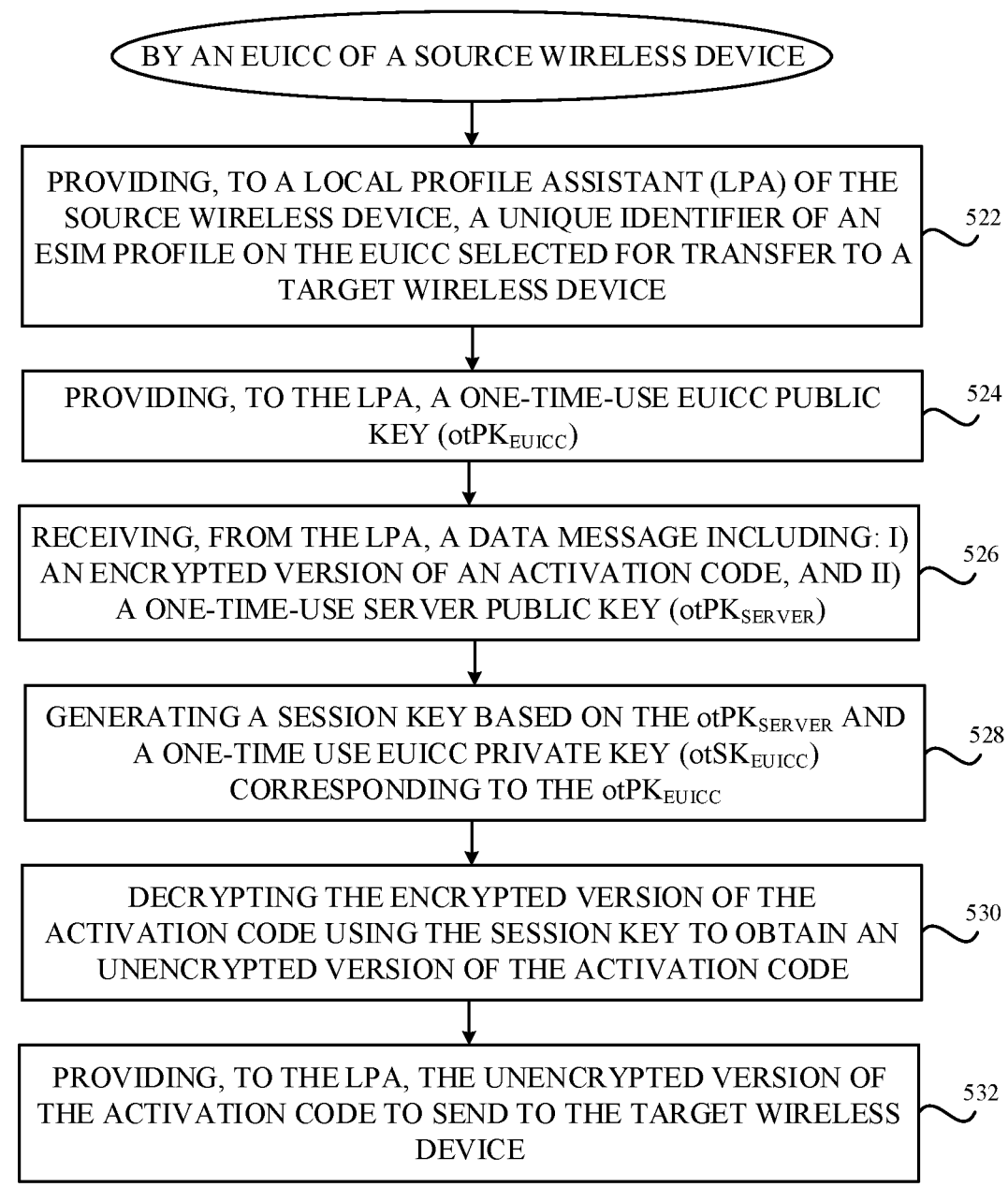
FIG. 5B illustrates a flowchart of an exemplary method performed by an eUICC of a source wireless device to transfer a cellular wireless service subscription associated with an eSIM profile of the source wireless device to a target wireless device, according to some embodiments.

FIG. 5B illustrates a flowchart 520 of an exemplary method performed by an eUICC 108 of a source wireless device 102A to transfer a cellular wireless service subscription associated with an eSIM profile 208 of the source wireless device 102A to a target wireless device 102B. At 522, the eUICC 108 provides, to an LPA 404 of the source wireless device 102A, a unique identifier of an eSIM profile 208 on the eUICC 108 for transfer to the target wireless device 102B. At 524, the eUICC 108 provides, to the LPA 404, a one-time-use eUICC public key ($otPK_{eUICC}$). At 526, the eUICC 108 receives, from the LPA 404, a data message including i) an encrypted version of an activation code, and ii) a one-time-use server public key ($otPK_{Server}$). The activation code allows the target wireless device 102B to obtain, from an MNO provisioning server 116, a new eSIM profile 208 associated with transfer of the eSIM cellular wireless service subscription to the target wireless device 102B. The MNO provisioning server 116 generates the encrypted version of the activation code using a session key based on the $otPK_{eUICC}$ and on a one-time-use server private key ($otSK_{Server}$) corresponding to the $otPK_{Server}$. At 528, the eUICC 108 generates the session key based on the $otPK_{Server}$ and a one-time-use eUICC private key ($otSK_{eUICC}$) corresponding to the $otPK_{eUICC}$. At 530, the eUICC 108 decrypts the encrypted version of the activation code using the session key to obtain an unencrypted version of the activation code. At 532, the eUICC 108 provides, to the LPA 404, the unencrypted version of the activation code to send to the target wireless device 102B.

In some embodiments, the data message, received from the LPA 404 by the eUICC 108, further includes i) a deletion flag requiring deletion of the eSIM profile 208, and ii) a signature generated by the MNO provisioning server 116; and the method further includes the eUICC 108 verifying integrity of the data message using the signature to protect against alteration of the data message that includes the deletion flag. In some embodiments, the method further includes the eUICC 108: i) deleting the eSIM profile 208 from the eUICC 108, and ii) providing, to the LPA 404 with the unencrypted version of the activation code, a delete profile notification message indicating deletion of the eSIM profile 208 from the eUICC 108.

Figure 5C:
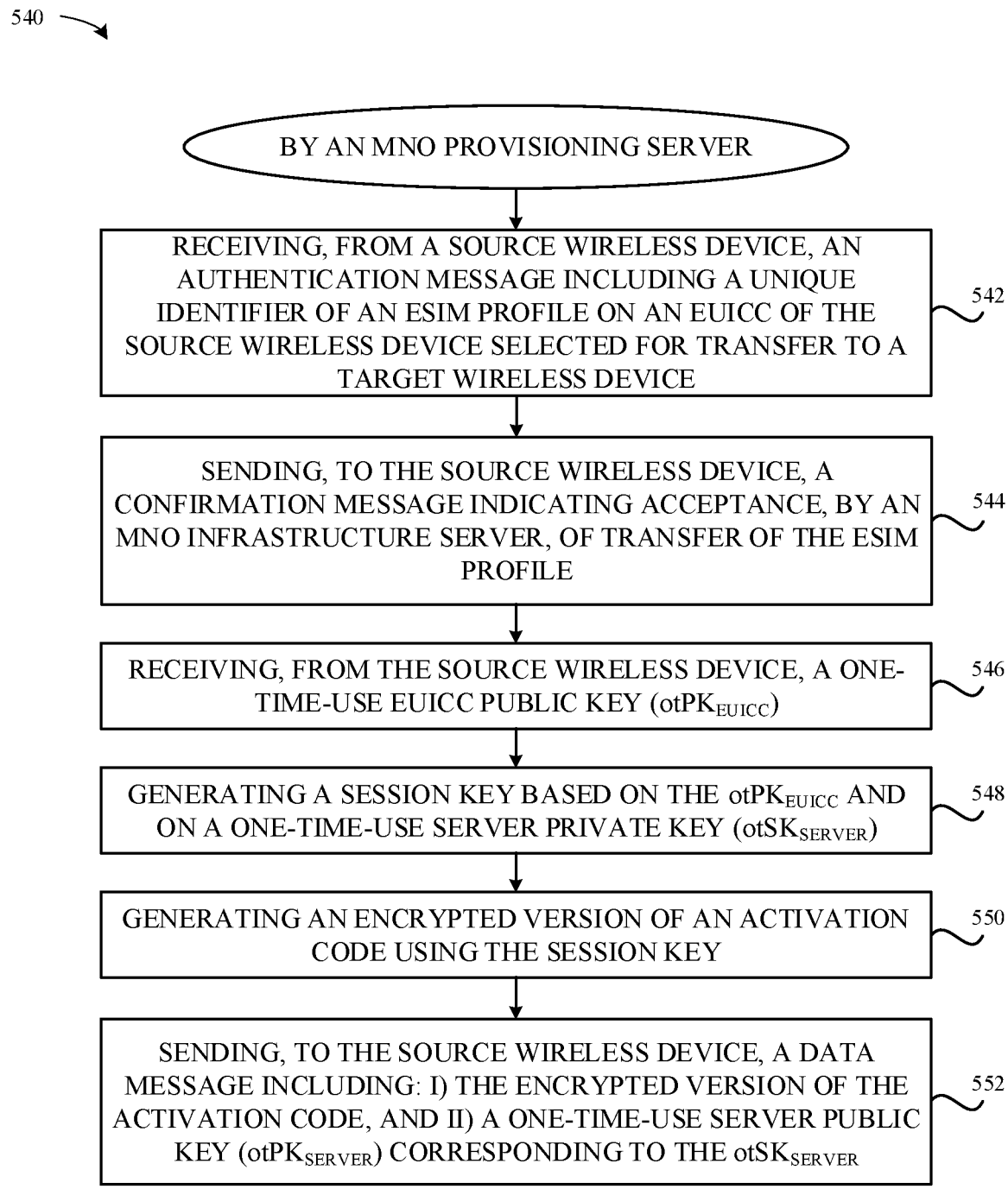
FIG. 5C illustrates a flowchart of an exemplary method performed by an MNO provisioning server to transfer a cellular wireless service subscription associated with an eSIM profile of a source wireless device to a target wireless device, according to some embodiments.

FIG. 5C illustrates a flowchart 540 of an exemplary method performed by an MNO provisioning server 116 for secure transfer of an eSIM cellular wireless service subscription from a source wireless device 102A to a target wireless device 102B. At 542, the MNO provisioning server 116 receives, from the source wireless device 102A, an authentication message including a unique identifier of an eSIM profile 208 on an eUICC 108 of the source wireless device 102A selected for transfer to the target wireless device 102B. At 544, the MNO provisioning server 116 sends, to the source wireless device 102A, a confirmation message indicating acceptance, by an MNO infrastructure server 304, of transfer of the eSIM profile 208. At 546, the MNO provisioning server 116 receives, from the source wireless device 102A, a one-time-use eUICC public key ($otPK_{eUICC}$). At 548, the MNO provisioning server 116 generates a session key based on the $otPK_{eUICC}$ and on a one-time-use server private key ($otSK_{Server}$). At 550, the MNO provisioning server 116 generates an encrypted version of an activation code using the session key. At 552, the MNO provisioning server 116 sends to the source wireless device 102A, a data message including i) the encrypted version of the activation code, and ii) a one-time-use server public key ($otPK_{Server}$) corresponding to the $otSK_{Server}$. The activation code allows the target wireless device 102B to obtain, from the MNO provisioning server 116, a new eSIM profile 208 associated with transfer of the eSIM cellular wireless service subscription to the target wireless device 102B.

In some embodiments, the data message further includes i) a deletion flag requiring deletion of the eSIM profile 208 from the eUICC 108 of the source wireless device 102A, and ii) a signature generated by the MNO provisioning server 116, and the eUICC 108 verifies integrity of the data message using the signature to protect against alteration of the data message that includes the deletion flag. In some embodiments, the method further includes the MNO provisioning server 116: i) sending, to the MNO infrastructure server 304, a confirm device change message that includes the unique identifier of the eSIM profile 208 of the eUICC 108 of the source wireless device 102A, and ii) receiving, from the MNO infrastructure server 304, a response message indicating acceptance of transfer of the eSIM profile 208. In some embodiments, the response message includes a confirmation code indicating user authentication is required for transfer of the eSIM profile 208. In some embodiments, the MNO infrastructure server 304 provides the confirmation code to a user 402 of the source wireless device 102A via an out-of-band channel. In some embodiments, the confirmation message, sent to the source wireless device 102A, includes an indication that user authentication via the confirmation code is required for transfer of the eSIM profile 208. In some embodiments, the method further includes the MNO provisioning server 116: i) receiving, from the source wireless device 102A, a hashed version of the confirmation code with the $otPK_{eUICC}$, ii) determining whether the hashed version of the confirmation code corresponds the confirmation code received from the MNO infrastructure server 304, and iii) sending, to the source wireless device 102A, an error indication when the hashed version of the confirmation code does not correspond to the confirmation code. In some embodiments, the MNO provisioning server 116 sends the data message that includes the encrypted version of the activation code to the source wireless device 102A only when the hashed version of the confirmation code corresponds to the confirmation code received from the MNO infrastructure server 304.

Figure 6:
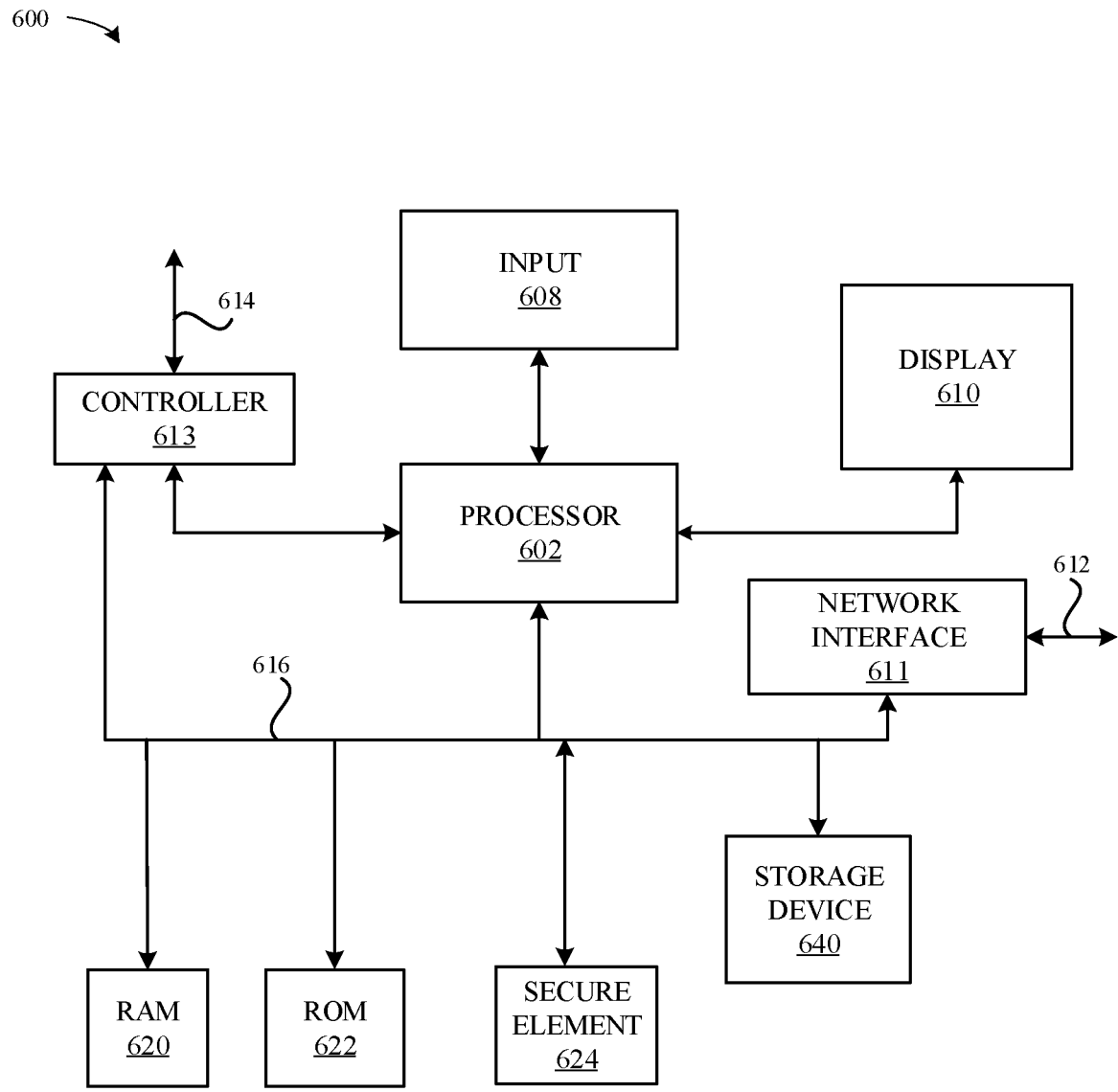
FIG. 6 illustrates a block diagram of exemplary elements of a wireless device, according to some embodiments.

FIG. 6 illustrates a detailed view of a representative computing device 600 that can be used to implement various methods described herein, according to some embodiments. In particular, the detailed view illustrates various components that can be included in the wireless device 102. As shown in FIG. 6, the computing device 600 can include a processor 602 that represents a microprocessor or controller for controlling the overall operation of computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, etc. Still further, the computing device 600 can include a display 610 that can be controlled by the processor 602 to display information to the user. A data bus 616 can facilitate data transfer between at least a storage device 640, the processor 602, and a controller 613. The controller 613 can be used to interface with and control different equipment through an equipment control bus 614. The computing device 600 can also include a network/bus interface 611 that communicatively couples to a data link 612. In the case of a wireless connection, the network/bus interface 611 can include a wireless transceiver.

The computing device 600 also includes a storage device 640, which can comprise a single disk or a plurality of disks (e.g., hard drives), and includes a storage management module that manages one or more partitions within the storage device 640. In some embodiments, storage device 640 can include flash memory, semiconductor (solid state) memory or the like. The computing device 600 can also include a Random Access Memory (RAM) 620 and a Read-Only Memory (ROM) 622. The ROM 622 can store programs, utilities or processes to be executed in a non-volatile manner. The RAM 620 can provide volatile data storage, and stores instructions related to the operation of the computing device 600. The computing device 600 can further include a secure element (SE) 624, which can represent secure storage for cellular wireless system access by the wireless device 102, such as an eUICC 108 on which to store one or more eSIMs 208 and/or a UICC 118 on which to store a physical SIM (pSIM).

Wireless Terminology

In accordance with various embodiments described herein, the terms "wireless communication device," "mobile wireless device," "wireless device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE, LTE-A, or 5G wireless networks are otherwise unavailable.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

Regarding the present disclosure, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for secure transfer of an electronic Subscriber Identity Module (eSIM) cellular wireless service subscription from a source wireless device to a target wireless device, the method comprising:
by a local profile assistant (LPA) of the source wireless device:
sending, to a mobile network operator (MNO) provisioning server, an authentication message including a unique identifier of an eSIM profile installed on an embedded universal integrated circuit card (eUICC) of the source wireless device and selected for transfer to the target wireless device;
receiving, from the MNO provisioning server, a confirmation message indicating acceptance, by an MNO infrastructure server, of transfer of the eSIM profile;
sending, to the MNO provisioning server, a one-time-use eUICC public key ($otPK_{eUICC}$);
receiving, from the MNO provisioning server, a data message including i) an encrypted version of an activation code, and ii) a one-time-use server public key (otPK$_{server}$), wherein:
the activation code allows the target wireless device to obtain, from the MNO provisioning server, a new eSIM profile associated with transfer of the eSIM cellular wireless service subscription to the target wireless device; and
the MNO provisioning server generates the encrypted version of the activation code using a session key based on the otPK$_{eUICC}$ and on a one-time-use server private key (otSK$_{server}$) corresponding to the otPK$_{server}$;
providing, to the eUICC, the data message;
receiving, from the eUICC, an unencrypted version of the activation code; and
sending, to the target wireless device, the unencrypted version of the activation code.

2. The method of claim 1, wherein:
the data message, received from the MNO provisioning server, further includes i) a deletion flag requiring deletion of the eSIM profile from the eUICC of the source wireless device, and ii) a signature generated by the MNO provisioning server; and
the eUICC verifies integrity of the data message using the signature to protect against alteration of the data message that includes the deletion flag.

3. The method of claim 2, wherein the eUICC deletes the eSIM profile, when the data message includes the deletion flag, before providing to the LPA the unencrypted version of the activation code.

4. The method of claim 3, further comprising:
by the LPA of the source wireless device:
receiving, from the eUICC with the unencrypted version of the activation code, a delete profile notification message indicating deletion of the eSIM profile from the eUICC; and
providing, to the target wireless device with the activation code, the delete profile notification message, wherein the target wireless device sends the delete profile notification message to the MNO provisioning server to confirm deletion of the eSIM profile from the eUICC of the source wireless device.

5. The method of claim 4, wherein the target wireless device sends the delete profile notification message to the MNO provisioning server together with a request to obtain the new eSIM profile.

6. The method of claim 4, wherein the target wireless device sends the delete profile notification message to the MNO provisioning server separately from a request to obtain the new eSIM profile.

7. The method of claim 1, wherein:
the confirmation message received from the MNO provisioning server includes an indication that user authentication via a confirmation code is required for transfer of the eSIM profile; and
the method further includes the LPA receiving, via an input/output of the source wireless device, user authentication for transfer of the eSIM profile.

8. The method of claim 7, wherein the user authentication includes the confirmation code.

9. The method of claim 8, wherein the method further includes the LPA sending, to the MNO provisioning server, a hashed version of the confirmation code with the otPK$_{eUICC}$ to allow the MNO provisioning server to confirm receipt of the confirmation code by the source wireless device before sending the encrypted version of the activation code to the source wireless device.

10. A method for secure transfer of an electronic Subscriber Identity Module (eSIM) cellular wireless service subscription from a source wireless device to a target wireless device, the method comprising:
by an embedded universal integrated circuit card (eUICC) of the source wireless device:
providing, to a local profile assistant (LPA) of the source wireless device, a unique identifier of an eSIM profile on the eUICC selected for transfer to the target wireless device;
providing, to the LPA, a one-time-use eUICC public key (otPK$_{eUICC}$);
receiving, from the LPA, a data message including i) an encrypted version of an activation code, and ii) a one-time-use server public key (otPK$_{Server}$), wherein:
the activation code allows the target wireless device to obtain, from a mobile network operator (MNO) provisioning server, a new eSIM profile associated with transfer of the eSIM cellular wireless service subscription to the target wireless device; and
the MNO provisioning server generates the encrypted version of the activation code using a session key based on the otPK$_{eUICC}$ and on a one-time-use server private key (otSK$_{server}$) corresponding to the otPK$_{Server}$;
generating the session key based on the otPK$_{server}$ and a one-time-use eUICC private key (otSK$_{eUICC}$) corresponding to the otPK$_{eUICC}$;
decrypting the encrypted version of the activation code using the session key to obtain an unencrypted version of the activation code; and
providing, to the LPA, the unencrypted version of the activation code to send to the target wireless device.

11. The method of claim 10, wherein:
the data message, received from the LPA, further includes i) a deletion flag requiring deletion of the eSIM profile, and ii) a signature generated by the MNO provisioning server; and
the method further comprises verifying, by the eUICC, integrity of the data message using the signature to protect against alteration of the data message that includes the deletion flag.

12. The method of claim 11, further comprising:
by the eUICC of the source wireless device:
deleting the eSIM profile from the eUICC; and
providing, to the LPA with the unencrypted version of the activation code, a delete profile notification message indicating deletion of the eSIM profile from the eUICC.

13. A method for secure transfer of an electronic Subscriber Identity Module (eSIM) cellular wireless service subscription from a source wireless device to a target wireless device, the method comprising:
by a mobile network operator (MNO) provisioning server:
receiving, from the source wireless device, an authentication message including a unique identifier of an eSIM profile on an embedded universal integrated circuit card (eUICC) of the source wireless device selected for transfer to the target wireless device;
sending, to the source wireless device, a confirmation message indicating acceptance, by an MNO infrastructure server, of transfer of the eSIM profile;
receiving, from the source wireless device, a one-time-use eUICC public key (otPK$_{eUICC}$);
generating a session key based on the otPK$_{eUICC}$ and on a one-time-use server private key (otSK$_{Server}$);

generating an encrypted version of an activation code using the session key; and sending, to the source wireless device, a data message including i) the encrypted version of the activation code, and ii) a one-time-use server public key ($otPK_{Server}$) corresponding to the $otSK_{Server}$;

wherein the activation code allows the target wireless device to obtain, from the MNO provisioning server, a new eSIM profile associated with transfer of the eSIM cellular wireless service subscription to the target wireless device.

14. The method of claim 13, wherein:

the data message further includes i) a deletion flag requiring deletion of the eSIM profile from the eUICC of the source wireless device, and ii) a signature generated by the MNO provisioning server; and the eUICC verifies integrity of the data message using the signature to protect against alteration of the data message that includes the deletion flag.

15. The method of claim 13, further comprising:

by the MNO provisioning server:

sending, to the MNO infrastructure server, a confirm device change message that includes the unique identifier of the eSIM profile of the eUICC of the source wireless device; and receiving, from the MNO infrastructure server, a response message indicating acceptance of transfer of the eSIM profile.

16. The method of claim 15, wherein:

the response message includes a confirmation code indicating user authentication is required for transfer of the eSIM profile.

17. The method of claim 16, wherein the MNO infrastructure server provides the confirmation code to a user of the source wireless device via an out-of-band channel.

18. The method of claim 16, wherein the confirmation message, sent to the source wireless device, includes an indication that user authentication via the confirmation code is required for transfer of the eSIM profile.

19. The method of claim 18, further comprising:

receiving, from the source wireless device, a hashed version of the confirmation code with the $otPK_{eUICC}$;

determining whether the hashed version of the confirmation code corresponds the confirmation code received from the MNO infrastructure server; and sending, to the source wireless device, an error indication when the hashed version of the confirmation code does not correspond to the confirmation code.

20. The method of claim 19, wherein the MNO provisioning server sends the data message that includes the encrypted version of the activation code to the source wireless device only when the hashed version of the confirmation code corresponds to the confirmation code received from the MNO infrastructure server.

* * * * *